United States Patent
Matsuo et al.

(10) Patent No.: US 8,992,382 B2
(45) Date of Patent: Mar. 31, 2015

(54) AUTOMATIC TRANSMISSION CONTROL DEVICE

(71) Applicant: JATCO Ltd, Fuji-shi, Shizuoka (JP)

(72) Inventors: Katsuhiro Matsuo, Isehara (JP); Shunsuke Ogasawara, Isehara (JP)

(73) Assignee: JATCO Ltd, Fuji-shi (JP)

( * ) Notice: Subject to any disclaimer, the term of this patent is extended or adjusted under 35 U.S.C. 154(b) by 0 days.

(21) Appl. No.: 14/358,424

(22) PCT Filed: Oct. 23, 2012

(86) PCT No.: PCT/JP2012/077279
§ 371 (c)(1),
(2) Date: May 15, 2014

(87) PCT Pub. No.: WO2013/073343
PCT Pub. Date: May 23, 2013

(65) Prior Publication Data
US 2014/0315686 A1    Oct. 23, 2014

(30) Foreign Application Priority Data

Nov. 18, 2011   (JP) ................................. 2011-253331

(51) Int. Cl.
| | |
|---|---|
| *F16H 59/48* | (2006.01) |
| *B60W 10/11* | (2012.01) |
| *F16H 61/02* | (2006.01) |
| *F16H 61/10* | (2006.01) |
| *B60W 10/06* | (2006.01) |
| *F16H 61/684* | (2006.01) |

(52) U.S. Cl.
CPC ............ *B60W 10/11* (2013.01); *F16H 61/0213* (2013.01); *F16H 61/10* (2013.01); *B60W 10/06* (2013.01); *F16H 61/684* (2013.01)
USPC .......................................... 477/120; 477/115

(58) Field of Classification Search
CPC . B60W 10/11; B60W 40/105; F16H 61/0213; F16H 61/684
USPC .......... 477/115, 120, 904, 905; 701/51, 58, 70
See application file for complete search history.

(56) References Cited

U.S. PATENT DOCUMENTS

| | | | |
|---|---|---|---|
| 5,097,725 A | | 3/1992 | Sawa |
| 5,591,102 A | * | 1/1997 | White et al. ................... 477/107 |
| 8,052,573 B2 | * | 11/2011 | Honma ........................... 477/77 |
| 8,112,204 B2 | | 2/2012 | Yamada et al. |
| 2008/0119327 A1 | * | 5/2008 | Kitaori et al. ................. 477/120 |
| 2009/0248233 A1 | | 10/2009 | Yamada et al. |

FOREIGN PATENT DOCUMENTS

| | | |
|---|---|---|
| JP | 06-037932 B2 | 5/1994 |
| JP | 11-325231 A | 11/1999 |
| JP | 2009-236254 A | 10/2009 |

* cited by examiner

*Primary Examiner* — Justin Holmes
(74) *Attorney, Agent, or Firm* — Foley & Lardner LLP

(57) ABSTRACT

In a control apparatus for an automatic transmission in which a read-ahead vehicle speed which is a future vehicle speed is estimated on a basis of an acceleration and an actual vehicle speed and a gear shift control is carried out on a basis of the read-ahead vehicle speed and other driving parameters, a start of an up-shift is inhibited even if a determination of the up-shift is made for a predetermined time after a down-shift in a coast state has occurred and executing the up-shift after the predetermined time is elapsed. Consequently, while an unpleasant feeling given to a driver is suppressed, an appropriate gear shift is executable.

4 Claims, 5 Drawing Sheets

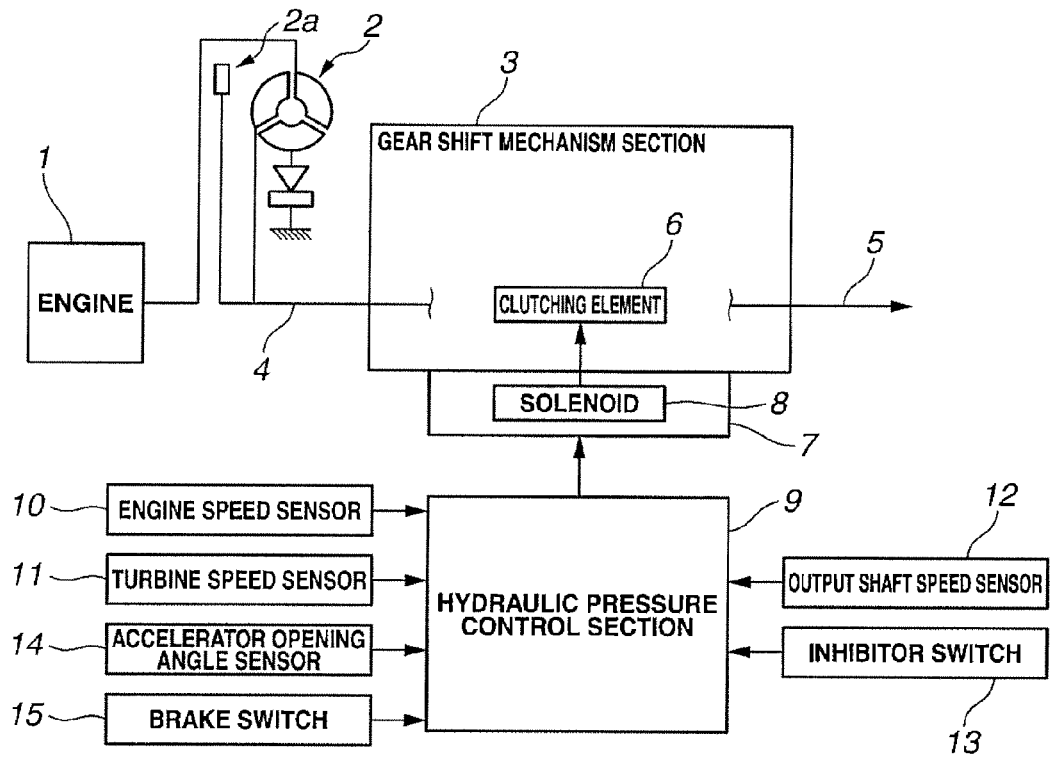
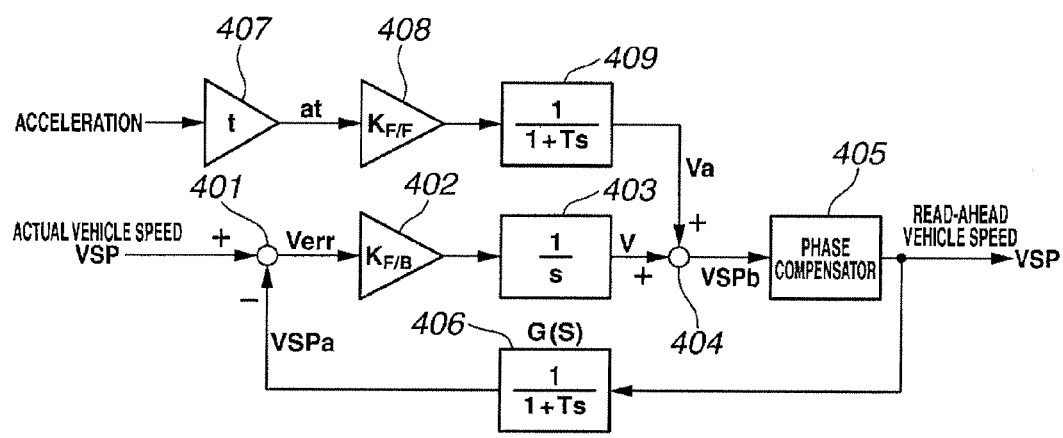

AUTOMATIC TRANSMISSION CONTROL DEVICE

TECHNICAL FIELD

The present invention relates to a gear shift control for an automatic transmission.

BACKGROUND ART

Conventionally, as described in a Patent Document 1, a vehicle speed to which would, in future, be reached on a basis of the present vehicle speed and an acceleration (hereinafter, referred to as a read-ahead (or look-ahead) vehicle speed) is estimated and, using this read-ahead vehicle speed, a gear shift control is carried out. This can prevent the gear shift from being generated with a delay from a preset gear shift line especially at a time of an abrupt deceleration. Therefore, an excessively slow of an engine revolution, or so forth can be suppressed and a driveability is improved.

However, since an actual vehicle speed is not so varied but the read-ahead vehicle speed is varied depending upon a difference in the deceleration, the read-ahead vehicle speed traverses an up-shift line and the up-shift is executed by only slightly loosening a brake pedal by a driver during a down-shift in the deceleration. That is to say, the driver continues to depress the brake pedal. In spite of the fact that the deceleration is requested, the up-shift is continuously generated after the down-shift. Consequently, a, so-called, shift busy feeling occurs in which the engine speed is repeatedly varied.

PRE-PUBLISHED DOCUMENT

Patent Document 1: Japanese Patent Application First Publication (tokkai) No. Heisei 11-325231.

DISCLOSURE OF THE INVENTION

With the above-described problem in mind, it is an object of the present invention to provide a control apparatus for an automatic transmission which is capable of executing an appropriate gear shift while suppressing an unpleasant feeling given to a driver.

In order to achieve the above-described object, according to the present invention, there is provided with a control apparatus for an automatic transmission in which a read-ahead vehicle speed which is a future vehicle speed is estimated on a basis of an acceleration and an actual vehicle speed and a gear shift control is carried out on a basis of the read-ahead vehicle speed and other driving parameters, the control apparatus comprising a delay up-shift control means for inhibiting a start of an up-shift even if a determination of the up-shift is made for a predetermined time after a down-shift in a coast state has occurred and executing the up-shift after the predetermined time is elapsed.

Thus, according to the present invention, even if the read-ahead vehicle speed is varied due to a slight variation of a brake pedal depression force and an up-shift request accordingly occurs, the up-shift is inhibited for the predetermined time. Hence, a generation of an unnecessary engine revolution number (speed) variation in a short time can be avoided and the gear shift control which eliminates the shift busy feeling can be achieved.

BRIEF DESCRIPTION OF THE DRAWINGS

FIG. 1 is a rough view representing a system configuration of an automatic transmission in a first preferred embodiment.

FIG. 2 is a control block diagram representing a calculation processing of a read-ahead vehicle speed.

EMBODIMENTS FOR CARRYING OUT THE INVENTION

Embodiment 1

Figure 3:
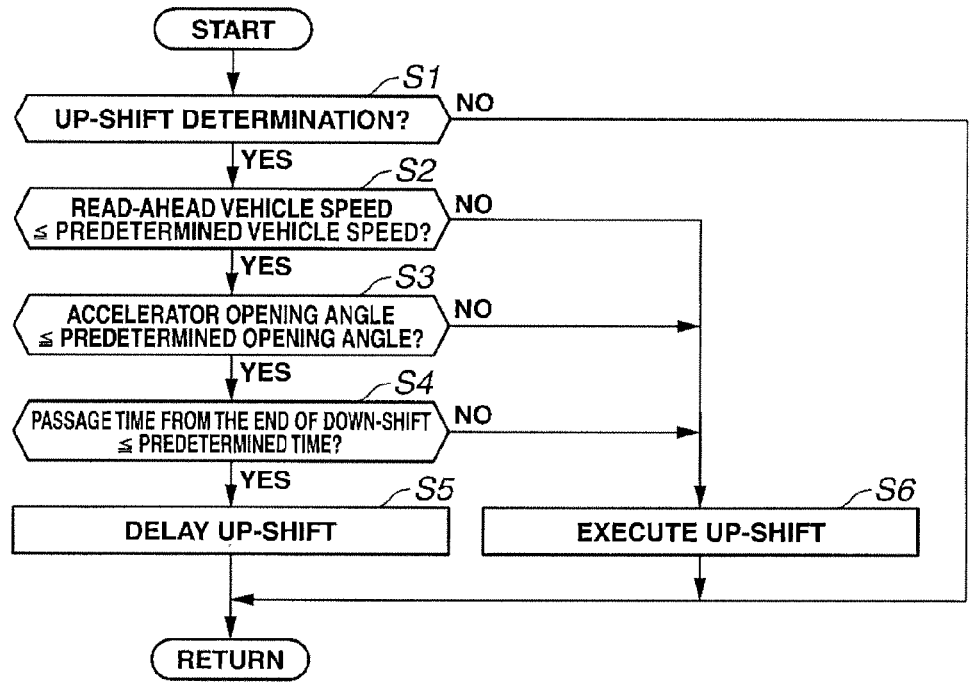
FIG. 3 is a flowchart representing an up-shift delay processing in the first preferred embodiment.

FIG. 1 shows a rough view of a system configuration of an automatic transmission in a first preferred embodiment. An engine 1 is connected to a gear shift mechanism section 3 of an automatic transmission via a torque converter 2. An output of engine 1 is adjusted by means of a throttle valve whose opening angle is interlocked with an accelerator pedal on which a driver manipulates and increasingly adjusted from a full closure state to a full open state. An output revolution of engine 1 is inputted to an input shaft 4 of gear shift mechanism 3 via torque converter 2. The structure of torque converter is known having an action amplifying an output torque of engine 1 by generating an input and output revolution number difference. In addition, torque converter 2 is provided with a lock-up clutch 2a which is capable of directly connecting engine 1 and gear shift mechanism 3 by suppressing the input-and-output revolution number difference, in other words, by suppressing a torque amplifying action.

Gear shift mechanism section 3 includes: a front planetary gear set and a rear planetary gear set (not shown) on coaxially arranged input shaft 4 and output shaft 5; and a plurality of clutching elements 6 operated by a hydraulic pressure. A combination of engagement and release of the plurality of clutching elements 6 causes a switch of a power transmission route to achieve a desired gear shift stage.

Oil passages through which a hydraulic pressure is supplied to respective clutching elements 6 (not shown) are formed within a valve body 7. A solenoid 8 is driven on a basis of a command inputted from hydraulic pressure control section 9. Solenoid 8 manipulates a pressure regulator valve (not shown) installed for each oil passage and is controlled so that the hydraulic pressure of a command pressure set by hydraulic pressure control section 9 is supplied to a predetermined clutching element. In addition, during a traveling of the vehicle, solenoid 8 is controlled so that the hydraulic pressure is supplied only to one of clutching element required to obtain a desired gear ratio.

Hydraulic pressure control section 9 determines the command pressure of a working hydraulic pressure supplied to one of clutching elements to be engaged on a basis of outputs such as an engine speed sensor 10 detecting an engine speed, a turbine speed sensor 11 detecting a speed of input shaft 4, an output shaft speed sensor 12 detecting the output speed of output shaft 5 (corresponds to a vehicle speed), an inhibitor switch 13 detecting a shift lever operating state manipulated by the driver, an accelerator opening angle sensor 14 detecting an opening angle of an accelerator pedal operated by the driver, a brake switch 15 detecting an operation state of a brake pedal operated by the driver.

Then, hydraulic pressure control section 9 outputs a command to drive solenoid 8 so that the working hydraulic pressure of the determined command pressure is supplied to the corresponding clutching element. Within hydraulic pressure control section 9, a shift map selecting an optimum gear shift stage on a basis of a driving point prescribed by read-ahead vehicle speed and accelerator opening angle as will be described later. In the shift map, an up-shift line for each gear shift stage and a down-shift line set toward a lower speed side than the up-shift line are set. When the driving point transverse these shift lines, a gear shift request is outputted.

Next, the read-ahead vehicle speed will be described.

FIG. 2 shows a control block diagram representing a read-ahead vehicle speed calculating process in the first preferred embodiment.

The shift line described above is, persistently, prescribed according to the driving point and it is necessary to consider an influence of an actual traveling environment or so forth. For example, under such a traveling environment that, although accelerator opening angle APO is large, a vehicle load is large, a time duration during which the vehicle speed ASP0 is raised and traverses the shift line becomes long and, on the other hand, under the traveling environment such that the vehicle load is small, the time duration during which the vehicle speed traverses the shift line becomes short.

In this way, it is requested that the timing is appropriately set in accordance with the traveling environment. This request is a special request for a region in which accelerator opening angle APO is large which tends to a long shift time and in a region in which accelerator opening angle APO is small and a large deceleration decelerated by the brake with small accelerator opening angle APO.

Therefore, a future vehicle speed by a predetermined time is estimated on a basis of an actual vehicle speed VSPO from actual output shaft speed sensor 12 and the gear shift control is carried out with the estimated vehicle speed as read-ahead vehicle speed VSP.

Vehicle speed estimation section 4 includes an integrator 403 and first order delay 406. If an estimated vehicle speed VSPa which is a present vehicle speed estimated on a basis of the read-ahead vehicle speed is coincident with actual vehicle speed VSPO, read-ahead vehicle speed is the future vehicle speed by a time in accordance with a lag (delay) element. Hereinafter, the details of respective blocks will be described.

A vehicle speed deviation calculating section 401 calculates a vehicle speed deviation Verr from actual vehicle speed VSPO and estimated vehicle speed VSPa on a basis of the following equation.

$$Verr = VSPO - VSPa \quad \text{(equation 1)}$$

A feedback gain multiplying section 402 multiplies calculated vehicle seed deviation Verr by a feedback gain kF/B.

An integrator 403 integrates kF/B·Verr as in the following equation to calculate an integration calculation value V.

$$V = kF/B(1/s) \quad \text{(equation 2)}$$

wherein s denotes a Laplace operator.

A predetermined time multiplying section 407 multiplies a vehicular acceleration detected by an acceleration sensor by a time t which is after a predetermined time to be estimated to calculate an acceleration component at.

A feedforward gain multiplying section 408 multiplies a calculated acceleration component at by a feedforward gain kF/F.

A speed conversion section 409 acts the following first order delay (lag) element on at·kF/F to calculate an acceleration component Va.

$$G(s) = (Ts+1) \quad \text{(equation 3)}$$

wherein T denotes a time constant corresponding to a read-ahead time which is a target for a designer.

A vehicle speed adding section 404 adds integration calculation value V and acceleration component vehicle speed Va to calculate a phase compensation prior read-ahead vehicle speed VSP22.

$$VSP22 = V + Va \quad \text{(equation 4)}$$

A phase compensator 405 carries out the following first order/first order phase compensation Gh(s) for phase compensation prior read-ahead vehicle speed to calculate the read-ahead vehicle speed VSP $$Gh(s) = (T2s+i)/(T1s+1) \quad \text{(equation 5)}$$

wherein T1, T2 denotes phase compensation constants. An introduction of this phase compensator 405 can set three design elements of phase compensation constants T1 and T2 and feedback gain kF/B for three unknown numbers of a first order delay (lag) pole, a natural frequency, and a damping factor, these representing a stability of a system and a response characteristic of the system. According to the above-described setting, a system that the designer has desired can be designed.

A first order delay (lag) 406 inputs read-ahead vehicle speed VSP and calculates a first order delay (lag) G(s) as shown in the following equation.

$$G(s) = 1/(Ts+1) \quad \text{(equation 6)}$$

wherein T denotes a time constant corresponding to a read-ahead time that the designer has aimed at.

As described above, read-ahead vehicle speed VSP is an estimation of the vehicle speed after a predetermined time in accordance with the traveling state of the vehicle. Using this vehicle speed, the gear map is referred to and the gear shift is carried out.

It should, herein, be noted that, in general, in a case where a brake depression force is large and the accelerator opening angle is low, it can be said that the above-described case is a traveling state in which a relatively large deceleration occurs. At this time, a separation between the actual vehicle speed and the read-ahead vehicle is large (hereinafter, this state is described as driving state 1).

On the other hand, in a case where the brake depression force is small and the accelerator opening angle is low, the separation between the actual vehicle speed and the read-ahead vehicle speed is small since the deceleration is small as compared with driving state 1 (hereinafter, this state is described as driving state 2).

Figure 4:
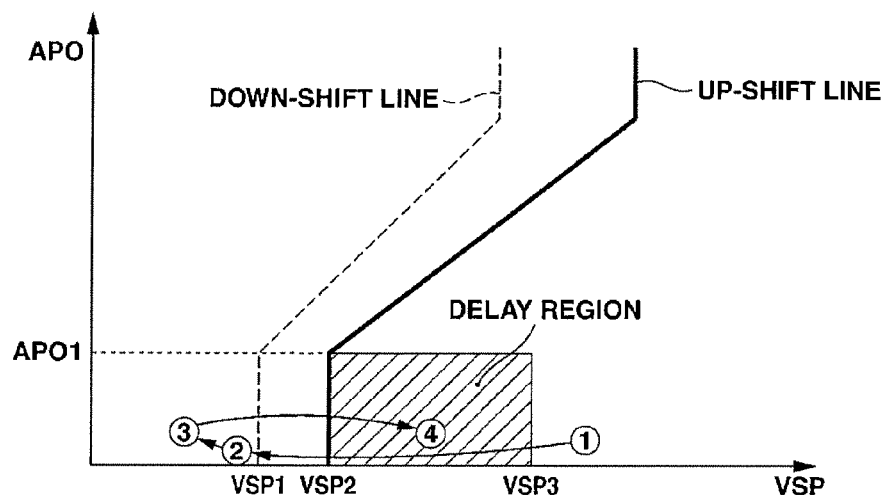
FIG. 4 is a shift map used for a gear shift control in the first preferred embodiment.

Under such a traveling situation as described above, how the driving point is varied will be explained on a basis of FIG. 4. FIG. 4 shows the shift map used for the gear shift control in the first embodiment.

In addition, this shift map of FIG. 4 represents a state transition in a case where an up-shift is carried out after a down-shift in a coast state.

Suppose a case where, under above-described driving state 1 (refer to ① in FIG. 4), the driving point traverses the down-shift line (refer to ② in FIG. 4) and the driving state is switched to driving state 2 after the down-shift due to a slight variation of the brake force that the driver does not intend (refer to a transition from ③ to ④ in FIG. 4). At this time, although the actual vehicle speed is not so varied, read-ahead vehicle speed VSP is raised due to the decrease of the deceleration. Hence, read-ahead vehicle speed VSP traverses the up-shift line and the up-shift is executed (generated). That is to say, the driver continues the depression of the brake pedal and, in spite of the fact that the driver persistently requests the deceleration, the up-shift (gear shift) is continuously generated after the down-shift. Consequently, a, so-called, shift busy feeling in which the engine speed is repeatedly varied problematically occurs.

Especially, in a coast region (a region in which the accelerator opening angle is low), it is general practice that such a shift line that an importance is placed on a fuel economy is set due to the fact that a high revolution gives a negative engine torque and a request torque by the driver is low. Therefore, the gear shift line is set in such a way that the gear shift is carried out before the engine speed is high and the shift lines are set to be dense. Hence, it is difficult to sufficiently secure a hysterisis between each up-shift line and each down-shift line. Thus, if, in the region of the coast state, the read-ahead vehicle speed is varied on a basis of a slight variation of the deceleration, the above-described problem is easy to occur.

Therefore, in the first embodiment, as shown in the shift map of FIG. 4, a delay region is set which is equal to or lower than a predetermined low accelerator opening angle APO1 representing the coast state and which is between a predetermined vehicle speed VSP2 on which the corresponding up-shift line is set and a higher speed side of VSP3. In a case where the up-shift determination request occurs after the down-shift is ended in the coast traveling state, the up-shift is carried out after a predetermined delay so that the above-described shift busy feeling is eliminated.

FIG. 3 is a flowchart representing an up-shift delay processing in the first preferred embodiment.

It should be noted that this flowchart is a control processing after the down-shift is carried out.

At a step S1, hydraulic pressure control section 9 determines whether the up-shift request occurs (whether the up-shift determination is made).

That is to say, hydraulic pressure control section 9 determines whether the driving point traverses the up-shift line from a leftward direction in FIG. 4 to a rightward direction in FIG. 4.

If, at step S1, the up-shift determination is made, the routine goes to a step S2. Otherwise, this control flow is ended.

At step S2, hydraulic pressure control section 9 determines whether the read-ahead vehicle speed is equal to or lower than a predetermined vehicle speed VSP3.

If equal to or lower than predetermined speed VSP3, the routine goes to a step S3. Otherwise, the routine goes to a step S6 in which the up-shift is executed due to not the delay region.

At step S3, the hydraulic pressure control section determines whether the accelerator opening angle is equal to or smaller than a predetermined opening angle APO1 representing that the accelerator opening angle is in the coast traveling state. If equal to or smaller than APO1, the routine goes to a step S4. Otherwise, the routine goes to step S6 to execute the up-shift since the present accelerator opening angle is not in the delay region.

At step S4, hydraulic pressure control section 9 determines whether a passage time from the end of the down-shift is equal to or shorter than a first predetermined time.

If equal to or shorter than the first predetermined time, the routine goes to step S5. Otherwise, the routine goes to step S6 to execute the up-shift.

It should, herein, be noted that whether the down-shift is ended or not is determined at a stage at which the actual gear ratio provides the gear ratio of the target gear shift stage and a high hydraulic pressure which is an addition of a predetermined safety percentage to the hydraulic pressure required for the engagement is supplied to the clutching element to be engaged after the gear shift.

At step S5, the execution of the up-shift is delayed.

Figure 5:
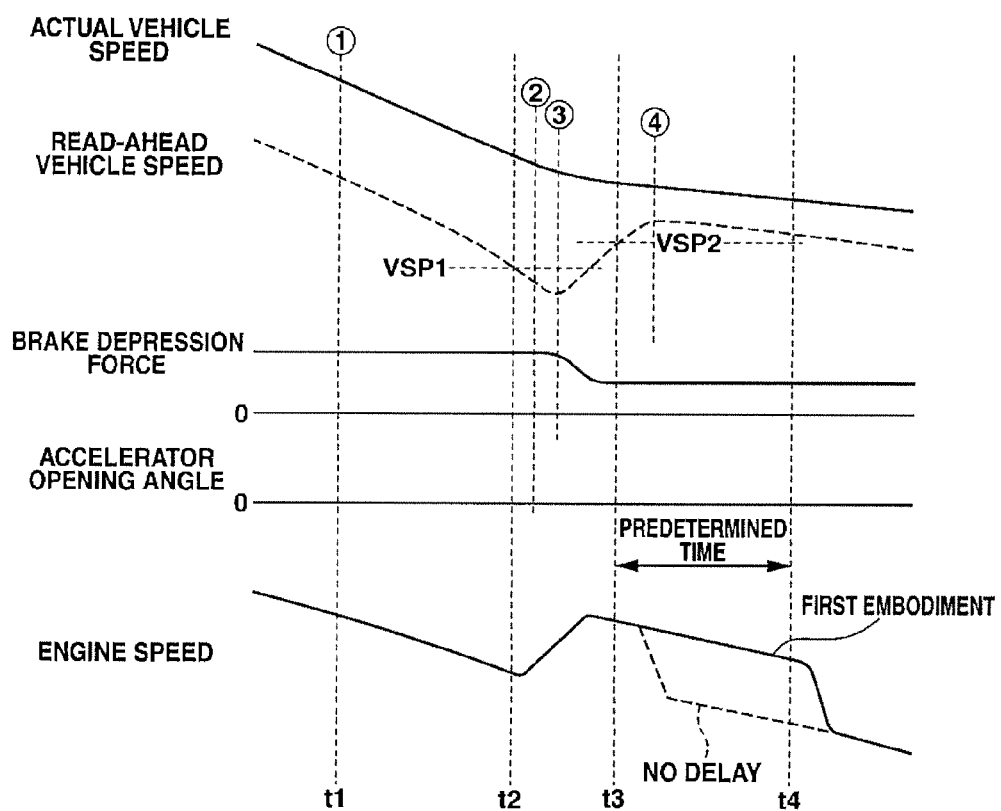
FIG. 5 is a timing chart representing an up-shift delay processing in the first preferred embodiment.

Next, an action based on the above-described control flow will be described. FIG. 5 shows a timing chart representing an up-shift delay processing in the first preferred embodiment.

At a time t1, the driver depresses the brake pedal and the vehicle is decelerated. At this time, read-ahead vehicle speed VSP is calculated to be low as compared with the actual vehicle speed.

When, at a time t2, read-ahead vehicle speed VSP traverses the down-shift line in the coast traveling state, the down-shift is executed. Specifically, the release side clutching element which is engaged at the gear shift stage before the gear shift is released and the engaged side clutching element which is engaged at the gear shift stage after the gear shift is engaged.

When, at a time t3, the engaged side clutching element is in a completely engaged state and the down-shift is ended, a count up of a timer is started.

At this time, when the driver depresses the brake pedal but slightly loosen the depression of the brake pedal, the determination that the deceleration becomes small is made and read-ahead vehicle is calculated to be near to the actual vehicle speed.

Although, at a time t4, the actual vehicle speed is not so varied, read-ahead vehicle VSP is largely raised due to the loosening of the brake pedal and traverses the up-shift line. Thus, the up-shift request is outputted. At this time, if the up-shift command were outputted without any delay processing, the engine speed raised due to the down-shift is promptly started to be reduced. In spite of the fact that the brake pedal is continuously depressed, the engine speed variation occurs so that the driver gives an unpleasant feeling (shift busy feeling). To avoid this unpleasant feeling, the up-shift is not carried out even though the up-shift request occurs for a first predetermined time from the down-shift end and the up-shift is carried out after the passage of the first predetermined time. Thus, the shift busy feeling can be eliminated and the gear shift control without unpleasant feeling can be achieved.

As described hereinabove, the following action and effect can be achieved in the first preferred embodiment.

(1) When, in the control apparatus for the automatic transmission in which read-ahead vehicle speed VSP which is the future vehicle speed is estimated on a basis of the acceleration and the actual vehicle speed and the gear shift control is carried out on a basis of read-ahead vehicle speed VSP and accelerator opening angle APO (other driving parameters), the down-shift occurs in the coast state, the start of the up-shift is inhibited even if the up-shift determination is made and the up-shift is executed after a passage of a predetermined time (delay up-shift control means).

Thus, even if the read-ahead vehicle speed is varied due to the slight variation of the brake pedal depression force and the up-shift request accordingly occurs, the up-shift is inhibited for the predetermined time. Hence, the occurrence of the unnecessary engine speed variation in a short time can be avoided and the gear shift control which eliminates the shift busy feeling can be achieved.

In addition, since, in the first embodiment, the up-shift is inhibited until the first predetermined time has passed from the end of the down-shift. Thus, even if a dispersion is present in a time required for the down-shift, the up-shift is inhibited for the first predetermined time from the time at which the engine speed variation occurs. Hence, even if the dispersion is present in the time required for the down-shift, the shift busy feeling can stably be suppressed.

(2) The shift map prescribed on a basis of read-ahead vehicle speed VSP and the accelerator opening angle is provided and the gear shift delay region is provided which is equal to or lower than predetermined opening angle APO1 and which is between up-shift line (VSP2) set at the higher vehicle speed side than the down-shift line and predetermined vehicle speed VSP3 (first vehicle speed) which is higher vehicle speed side than the up-shift line.

Then, when read-ahead vehicle speed VSP after the determination of the up-shift determination after the down-shift determination is present in the delay region, the up-shift is executed after the passage of the first predetermined time.

Thus, the up-shift request in the coast traveling state can be determined in a simple structure.

Figure 6:
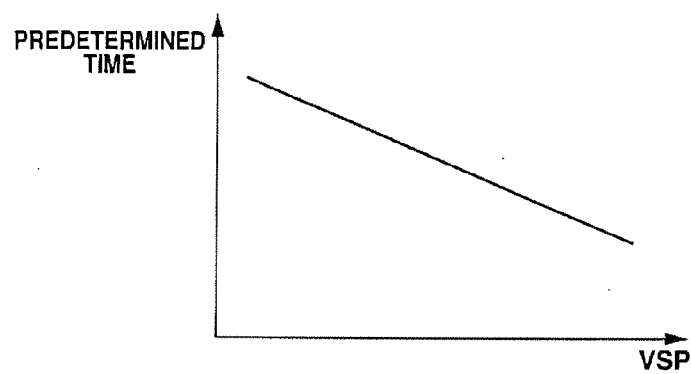
FIG. 6 is a map representing a relationship between the read-ahead vehicle speed and a predetermined time.

It should be noted that, in the first embodiment, the first predetermined time is determined as a fixed time. However, the first predetermined time may be varied in accordance with the read-ahead vehicle speed. FIG. 6 shows a map representing the relationship between the read-ahead vehicle speed and the predetermined time.

In a case where read-ahead vehicle speed VSP after the determination of the up-shift is low vehicle speed, an acceleration feeling is not given to the driver after the down-shift so that the shift busy feeling is remarkable. However, in a case where read-ahead vehicle speed after the determination of the up-shift determination is high vehicle speed, the driver gives a vehicular acceleration feeling. Hence, even if the up-shift occurs, the driver does not particularly give the unpleasant feeling.

Therefore, in this way, as read-ahead vehicle speed VSP after the up-shift determination becomes higher, the predetermined time is made shorter. Thus, while the shift busy feeling is avoided, the gear shift stage in accordance with the traveling state can quickly be selected.

Second Embodiment

Next, the second preferred embodiment will be explained. A basic structure of the second embodiment is the same as first preferred embodiment. Therefore, only a difference point will be explained. In the first embodiment, during the down-shift in the coast traveling state, the up-shift is delayed. Whereas, in the second embodiment, the delay time is made different in a case where the down-shift is the down-shift in the coast state and in a case where the down-shift is the down-shift in a drive state.

Figure 8:
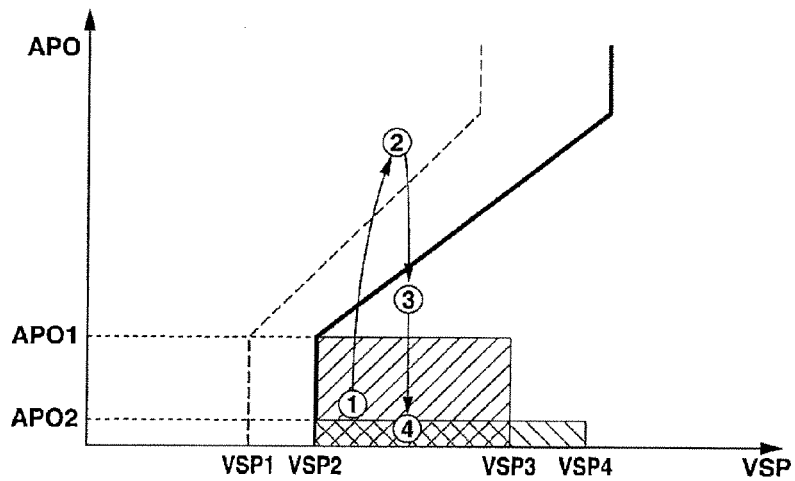
FIG. 8 is a shift map used for the gear shift control in the second preferred embodiment.

FIG. 8 shows the shift map used in the gear shift control in the second embodiment. In addition, this shift map represents a state transition in a case where the up-shift is carried out after the down-shift in the drive state. During the coast traveling state under the deceleration (refer to ① in FIG. 8), the driver depresses the accelerator pedal so that the driving point traverses the down-shift line and the down-shift is carried out.

Thereafter, when the driver abruptly change his intention to release his foot from the accelerator pedal, the driving point traverses the up-shift line with the actual vehicle speed almost unchanged. Therefore, the up-shift request is outputted. In this case, to eliminate the shift busy feeling, the up-shift delay is carried out. However, this is an operation accompanied with the accelerator pedal operation by the driver. Hence, the delay time is short as compared with the first embodiment and is set as a second predetermined time.

Figure 7:
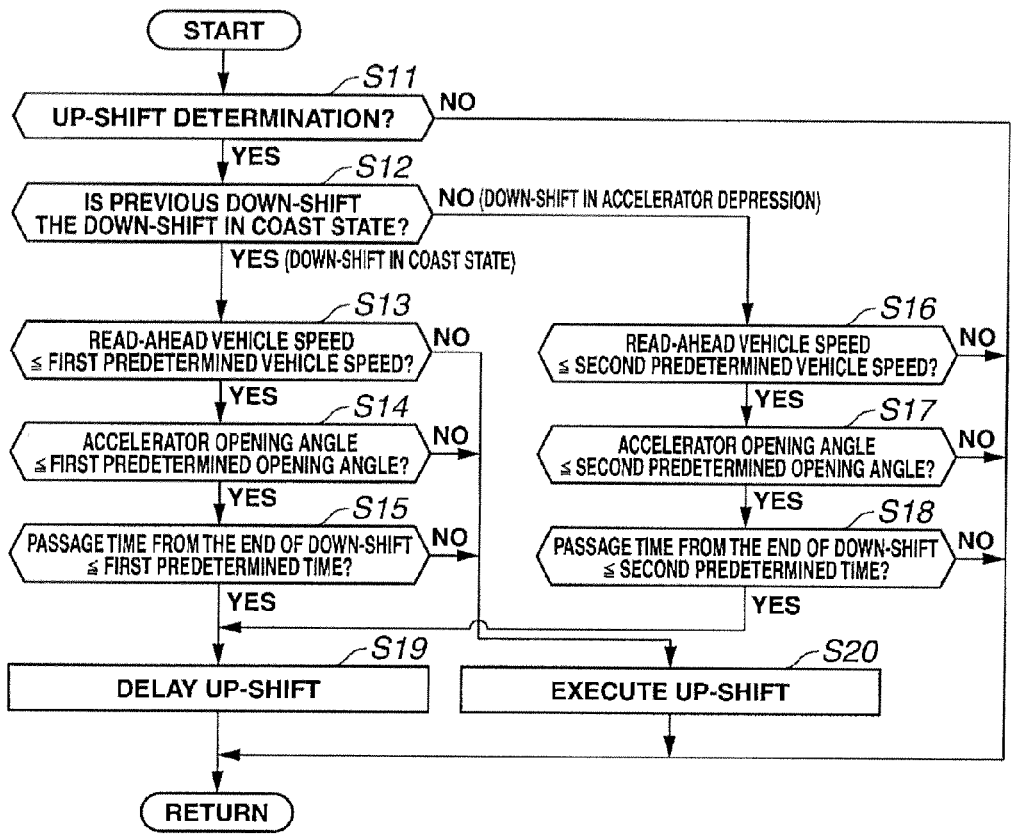
FIG. 7 is a flowchart representing the up-shift delay processing in a second preferred embodiment.

FIG. 7 shows a flowchart representing the up-shift delay processing in the second preferred embodiment. It should be noted that this flowchart is a control processing executed after the down-shift.

At a step S11, hydraulic pressure control section 9 determines whether the up-shift occurs (the down-shift determination), namely, the up-shift request occurs (determines whether the driving point traverses the up-shift line from the leftward direction to the rightward direction shown in FIG. 4).

If the up-shift is determined, the routine goes to a step S12. Otherwise, the present flow is ended.

At step S12, hydraulic pressure control section 9 determines whether the previous down-shift is the down-shift in the coast state. In the case of the down-shift in the coast state, the routine goes to a step S13. In the case of the down-shift in the drive state, the routine goes to a step S16.

It should be noted that the determination of whether the coast state or the drive state may be the determination of whether, for example, the down-shift is carried out whether accelerator opening angle is equal to or smaller than a predetermined value or an estimation of a positive or negative of an engine torque. If it is positive, the down-shift in the drive state is carried out. If it is negative, the down-shift in the coast state is carried out.

At step S13, hydraulic pressure control section 9 determines whether the read-ahead vehicle speed is equal to or lower than first predetermined vehicle speed VSP3. If equal to or below VSP3, the routine goes to a step S14. Otherwise, since the present driving point is outside of the delay region, the routine goes to a step S20 to execute the up-shift.

At step S14, hydraulic pressure control section 9 determine whether the accelerator opening angle is equal to or lower than a first predetermined opening angle APO1. If the accelerator opening angle is equal to or lower than the first predetermined opening angle, the routine goes to step S15. Otherwise, since the accelerator opening angle is outside of the delay region, the routine goes to a step S20 to execute the up-shift.

At step S15, hydraulic pressure control section 9 determines whether a passage time from the end of the down-shift is equal to or shorter than the first predetermined time. If equal to or shorter than the first predetermined time, the routine goes to a step S19. Otherwise, the routine goes to a step S20 and the up-shift is executed.

It should, herein, be noted that whether the down-shift is ended or not is determined at a stage at which the actual gear ratio provides the gear ratio of the target gear shift stage and a high hydraulic pressure which is an addition of a predetermined safety percentage to the hydraulic pressure required for the engagement is supplied to the clutching element to be engaged after the gear shift.

At step S16, hydraulic pressure control section 9 determines whether the read-ahead vehicle speed is equal to or lower than a second predetermined vehicle speed VSP4 which is higher than the first predetermined vehicle speed. If equal to or lower than VSP4, the routine goes to a step S17. Otherwise, since read-ahead vehicle speed is outside the delay region, the routine goes to step S20 to execute the up-shift.

The reason that second predetermined vehicle speed VSP4 is set to be higher is that read-ahead vehicle speed is calculated to be lower than the actual vehicle speed during the deceleration and to be higher than the actual vehicle speed during the acceleration. It should be noted that first predetermined vehicle speed VSP3 and second predetermined vehicle speed VSP4 may be the same vehicle speed.

At step S17, hydraulic pressure control section 9 determines whether the accelerator opening angle is equal to or smaller than second predetermined opening angle APO2 which is smaller than the first predetermined opening angle. If equal to or smaller than the second predetermined opening angle, the routine goes to a step S18. Otherwise, since the accelerator opening angle is outside of the delay region, the routine goes to step S20 to execute the up-shift. It should be noted that the reason that second predetermined opening angle is set to be low is to determine positively whether the driver has the intention to accelerate the vehicle. In a case where the acceleration intention is to some degree present, it is preferable to execute up-shift as the driver's intention without delay.

At step S18, hydraulic pressure controller 9 determines whether the passage time from the end of the down-shift is equal to or shorter than a second predetermined time.

If equal to or shorter than the second predetermined time, the routine goes to a step S19. Otherwise, the routine goes to step S20 to execute the up-shift.

It should, herein, be noted that whether the down-shift is ended or not is determined at a stage at which the actual gear ratio provides the gear ratio of the target gear shift stage and a high hydraulic pressure which is an addition of a predetermined safety percentage to the hydraulic pressure required for the engagement is supplied to the clutching element to be engaged after the gear shift.

At step S19, the execution of the up-shift is delayed.

Figure 9:
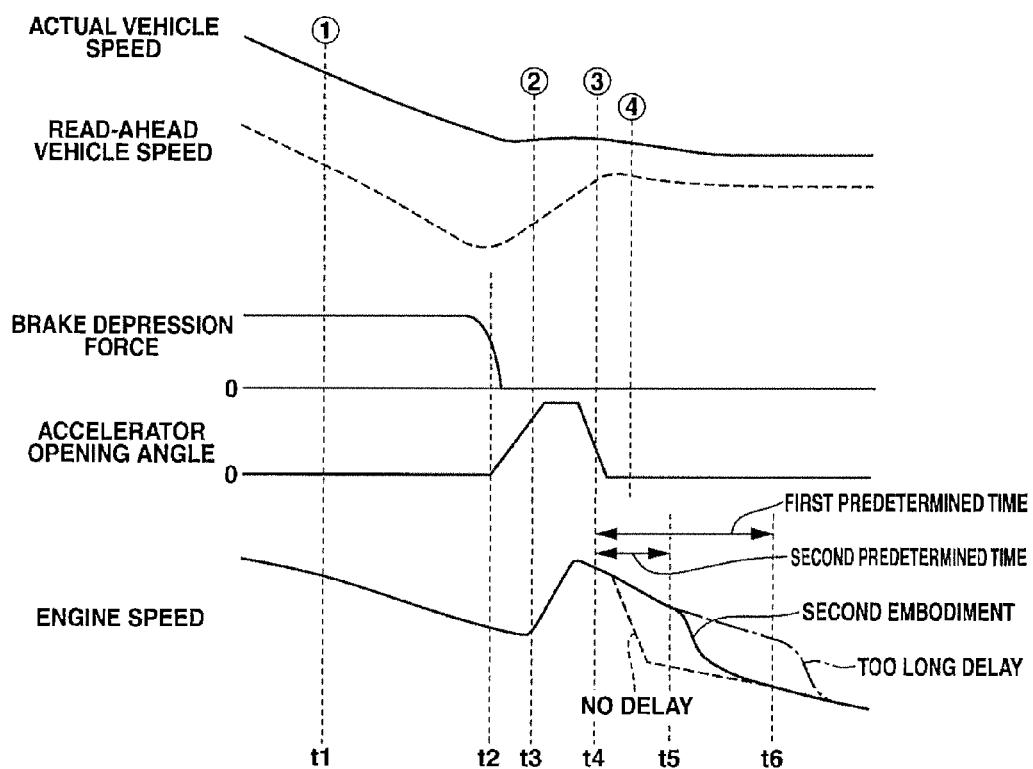
FIG. 9 is a timing chart representing the up-shift delay processing in the second preferred embodiment.

Next, the action based on the above-described control flow will be described. FIG. 9 shows a timing chart representing an up-shift delay processing in the second preferred embodiment.

At time t1, the driver depresses the brake pedal and the vehicle is decelerated. At this time, read-ahead vehicle speed VSP is calculated to be low as compared with the actual vehicle speed. At time t2, the driver releases the brake pedal and starts to depress the accelerator pedal. At time t3, the accelerator opening angle is large so that the driving point traverses the down-shift line (refer to ② in FIG. 8). Then, the down-shift is started. Accordingly, the engine speed is raised. Then, at time t4, when the down-shift is ended, the count up of the timer is started. However, although the driver once depresses the accelerator pedal, the driver changes his intention to release his foot from the accelerator pedal. At this time, the driving point, in turn, traverses the up-shift line (refer to ③ in FIG. 8) to output the up-shift request. However, since the count value of the timer indicates that the second predetermined time is not passed from the end of the down-shift, the up-shift is inhibited.

That is to say, the driver is completely released from the accelerator pedal and no acceleration intention is indicated, it is desirable to suppress the shift busy feeling due to the engine speed variation.

It should, herein, be noted that, in a case where the delay is not carried out, the engine speed variation frequently occurs and the shift busy feeling occurs although the driver completely releases from the accelerator pedal and, on the other hand, as in the coast traveling state, the delay is carried out for the first predetermined time (refer to time t6 in FIG. 9), the up-shift is unnecessarily delayed although it is involved in the accelerator operation by the driver. This also causes an unpleasant feeling for the driver.

As described hereinabove, the following action and effect can be obtained in the second preferred embodiment.

(4) In the delay up-shift control processing, in a case where the up-shift determination is made after the down-shift in the coast state, the up-shift is executed after the first predetermined time has elapsed and, in a case where the up-shift determination is made after the down-shift in the drive state, the up-shift is executed after the second predetermined time which is shorter than the above-described first predetermined time has elapsed.

Hence, while the shift busy feeling is eliminated, the gear shift control in accordance with the intention of the driver can be achieved.

As described above, the gear shift characteristic control processing according to the present invention has been described. Other modifications may be made not only the above-described structure. In the first embodiment, the start of counting of the predetermined time is after the down-shift end. However, the present invention is not limited to this. The start of the count may be started from a time point at which the down-shift request is outputted or may be a time point at which an inertia phase of the down-shift is started.

The invention claimed is:

1. A control apparatus for an automatic transmission in which a read-ahead vehicle speed which is a future vehicle speed is estimated on a basis of an acceleration and an actual vehicle speed and a gear shift control is carried out on a basis of the read-ahead vehicle speed and other driving parameters, the control apparatus comprising a delay up-shift control means for inhibiting a start of an up-shift even if a determination of the up-shift is made for a predetermined time after a down-shift in a coast state has occurred and executing the up-shift after the predetermined time is elapsed.

2. The control apparatus for the automatic transmission as claimed in claim 1, wherein the predetermined time becomes shorter as the read-ahead vehicle speed after the up-shift determination is made becomes higher.

3. The control apparatus for the automatic transmission as claimed in claim 1, wherein the delay up-shift control means is provided with a shift map prescribed on a basis of the read-ahead vehicle speed and an accelerator opening angle, a gear shift delay region is provided which is equal to or lower than a predetermined opening angle and between a down-shift line and a first vehicle speed which is a higher vehicle speed side than an up-shift line which is set to the higher vehicle speed side than the down-shift line, and the up-shift is executed after the predetermined time is elapsed, when the read-ahead vehicle speed after the determination of the up-shift after the determination of the down-shift is present in the delay region.

4. The control apparatus for the automatic transmission as claimed in claim 1, wherein the delay up-shift control means executes the up-shift after a first predetermined time is elapsed in a case where the up-shift determination is made after the down-shift in a coast state and executes the up-shift after a second predetermined time is elapsed which is shorter than the first predetermined time in a case where the up-shift determination is made after the down shift in a drive state.

* * * * *